(12) United States Patent
Mochizuki

(10) Patent No.: US 11,392,017 B2
(45) Date of Patent: Jul. 19, 2022

(54) LIGHT SOURCE UNIT AND PROJECTOR

(71) Applicant: CASIO COMPUTER CO., LTD., Tokyo (JP)

(72) Inventor: Hidehiko Mochizuki, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 17/158,946

(22) Filed: Jan. 26, 2021

(65) Prior Publication Data

US 2021/0149288 A1 May 20, 2021

Related U.S. Application Data

(63) Continuation of application No. PCT/JP2020/027988, filed on Jul. 20, 2020.

(30) Foreign Application Priority Data

Jul. 22, 2019 (JP) ................................ 2019-134541
Dec. 5, 2019 (JP) ................................ 2019-220092

(51) Int. Cl.
*G03B 21/20* (2006.01)
*G02B 26/00* (2006.01)
(Continued)

(52) U.S. Cl.
CPC ......... *G03B 21/204* (2013.01); *G02B 26/008* (2013.01); *G02B 27/102* (2013.01);
(Continued)

(58) Field of Classification Search
None
See application file for complete search history.

(56) References Cited

U.S. PATENT DOCUMENTS

2004/0027546 A1* 2/2004 Hirobe ............... G03B 21/2066
353/84
2013/0258639 A1 10/2013 Hu et al.
(Continued)

FOREIGN PATENT DOCUMENTS

JP 2011013316 A 1/2011
JP 2011-100163 A 5/2011
(Continued)

OTHER PUBLICATIONS

JPO; Application No. PCT/JP2020/027988; International Search Report dated Oct. 1, 2020.
(Continued)

*Primary Examiner* — Michelle M Iacoletti
*Assistant Examiner* — Danell L Owens
(74) *Attorney, Agent, or Firm* — Fitch, Even, Tabin & Flannery LLP

(57) ABSTRACT

A light source unit includes a blue laser diode of an excitation light shining device for emitting light in a first wavelength range, a red light source of a red light source device for emitting light in a second wavelength range, a luminescent wheel including a wavelength transforming area for transforming the light in the first wavelength range into light in a third wavelength range differing in wavelength range from the light in the first wavelength range and the light in the second wavelength range and emitting the light in the third wavelength range and a transmitting area for emitting the light in the first wavelength range, the wavelength transforming area and the transmitting area being provided end to end in a circumferential direction, and a dichroic mirror configured to transmit one of the lights in the first and second wavelength ranges and reflect a remaining light.

15 Claims, 5 Drawing Sheets

(51) Int. Cl.
*G02B 27/10* (2006.01)
*G02B 27/14* (2006.01)

(52) U.S. Cl.
CPC ......... *G02B 27/141* (2013.01); *G03B 21/208* (2013.01); *G03B 21/2013* (2013.01); *G03B 21/2066* (2013.01)

(56) References Cited

U.S. PATENT DOCUMENTS

2017/0111620 A1* 4/2017 Tian .................... H04N 9/3161
2017/0115500 A1 4/2017 Tian et al.

FOREIGN PATENT DOCUMENTS

| JP | 2018-013541 A | 1/2018 |
| JP | 2018-092137 A | 6/2018 |
| JP | 2018-159835 A | 10/2018 |

OTHER PUBLICATIONS

CNIPA; Application No. 202080003180.2; Office Action dated Aug. 31, 2021.
JPO; Application No. 2019-220092; Notice of Reasons for Refusal dated Nov. 25, 2021.

* cited by examiner

LIGHT SOURCE UNIT AND PROJECTOR

CROSS-REFERENCE TO RELATED APPLICATIONS

This application is a continuation of International Patent Application No. PCT/JP2020/027988 filed on Jul. 20, 2020, and claims priority to Japanese Patent Application No. 2019-220092 filed on Dec. 5, 2019 and Japanese Patent Application No. 2019-134541 filed on Jul. 22, 2019, the entire disclosures of which, including the specifications, claims, drawings and abstracts, are incorporated herein by reference.

BACKGROUND OF THE INVENTION

Field of the Invention

The present invention relates to a light source unit and a projector including this light source unit.

Description of the Related Art

There have conventionally been disclosed projectors that include a blue light source device for emitting light having a wavelength in the blue wavelength range or simply light in the blue wavelength range, a luminescent wheel including a luminescent light emitting area configured to receive light from the blue light source device as excitation light to thereby emit light having a wavelength in the green wavelength range or simply light in the green wavelength range and a diffuse transmitting area, and a red light source device for emitting light having a wavelength in the red wavelength range or simply light in the red wavelength range. For example, in Japanese Patent Laid-Open No. 2018-159835 (JP-A-2018-159835), light in the green wavelength range, which is luminescent light, is emitted to a front side of a luminescent wheel. Light in the blue wavelength range, which is light emitted from a blue light source device, is transmitted through a diffuse transmitting area on the luminescent wheel while being diffused and is then guided onto the same optical path as those of light in the green wavelength range and light in the red wavelength range by way of multiple reflection mirrors and collective lenses after it emerges from a back side of the luminescent wheel.

As in a luminescent wheel device of the projector disclosed in JP-A-2018-159835, when the blue light source device for emitting light in the blue wavelength range is used as a light source for excitation light which is used in the luminescent wheel, which is configured to emit luminescent light from the front side thereof, optical elements need to be disposed for guiding light in the blue wavelength range accordingly from the back side of the luminescent wheel, which sometimes results in enlargement in size of the projector.

SUMMARY OF THE INVENTION

The present invention has been made in view of the situations described above, and an object of the present invention is to provide a small light source unit and a projector which is made small in size by including the light source unit.

According to a first aspect of the present invention, there is provided a light source unit including a first light source for emitting light in a first wavelength range, a second light source for emitting light in a second wavelength range which differs in wavelength range from the light in the first wavelength range, a wheel including a wavelength transforming area configured to receive the light in the first wavelength range that is incident thereon from a first surface side to thereby transform the light in the first wavelength range into light in a third wavelength range which differs in wavelength range from the light in the first wavelength range and the light in the second wavelength range and emit the light in the third wavelength range from a second surface side and a transmitting area for emitting the light in the first wavelength range that is incident thereon from the first surface side from the second surface side, the wavelength transforming area and the transmitting area being provided end to end in a circumferential direction, and a dichroic mirror configured to transmit one of the light in the first wavelength range and the light in the second wavelength range and to reflect a remaining light.

According to a second aspect of the present invention, there is provided a projector including the light source unit described above, a display device onto which light source light from the light source unit is shined to thereby form image light, a projection optical system for projecting the image light emitted from the display device onto a screen, and a projection control unit for controlling the display device and the light source unit.

DETAILED DESCRIPTION OF THE PREFERRED EMBODIMENT

First Embodiment

Figure 1:
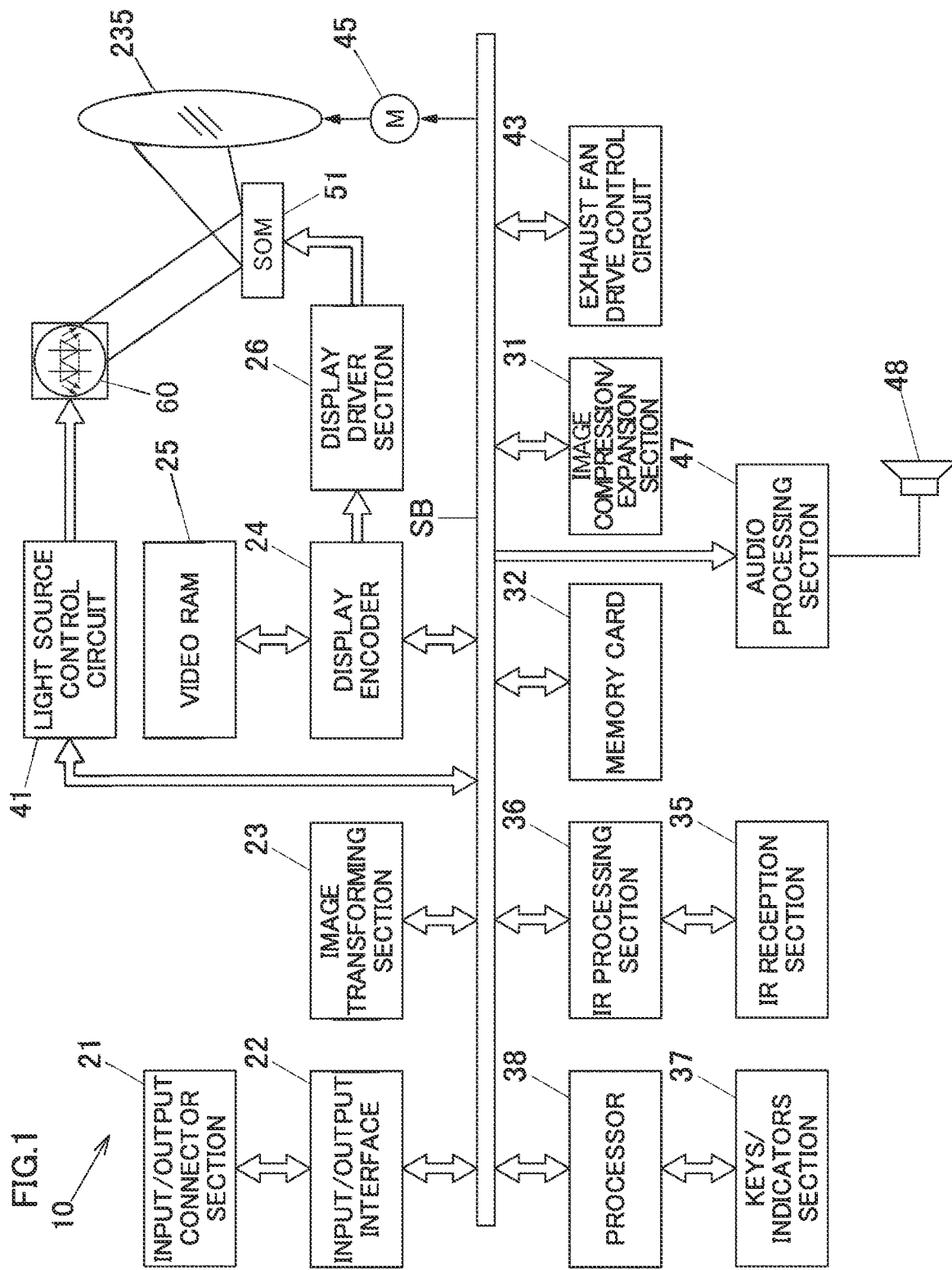
FIG. 1 is a block diagram showing functional circuitries of a projector according to a first embodiment of the present invention.

Hereinafter, a first embodiment of the present invention will be described. FIG. 1 is a block diagram showing functional circuitries of a projector control unit of a projector 10. The projector control unit is configured of CPU including an image transforming section 23 and a processor 38, a front-end unit including an input/output interface 22, and a formatter unit including a display encoder 24 and a display drive section 26.

The processor 38 governs the control of operations of individual circuitries inside the projector 10 and is configured of CPU, ROM that stores fixedly operation programs such as various settings or the like, RAM that is used as a work memory, and the like.

Then, with this control means, image signals of various standards which are input from an input/output connector section 21 are sent to the image transforming section 23 via the input/output interface 22 and a system bus (SB), and the image signals so sent are then transformed so as to be unified into an image signal of a predetermined format which is suitable for display in the image transforming section 23. Thereafter, the unified image signal is output to the display encoder 24.

Additionally, the display encoder 24 deploys the image signal input thereinto on a video RAM 25 for storage therein and generates a video signal from the contents of the video RAM 25 stored therein, outputting the video signal so generated to the display drive section 26.

The display drive section 26 functions as a display device control means and drives a display device 51, which is a spatial optical modulator (SOM), at an appropriate frame rate in response to the image signal output from the display encoder 24.

Then, in this projector 10, a pencil of light emitted from a light source unit 60 is shined onto the display device 50 via an optical system, whereby an optical image is formed with light reflected by the display device 50, and the image so formed is then projected onto a projection target member such as a screen, not shown, via a projection optical system for display on the screen. A movable lens group 235 of the projection optical system can be driven by a lens motor 45 for zooming and focusing.

An image compression/expansion section 31 performs a recording process in which a luminance signal and a color difference signal of the image signal are data compressed through processing such as Adaptive Discrete Cosine Transform (ADCT), Huffman effect and the like, and the compressed data is sequentially written on a memory card 32, which is a detachable recording medium.

Further, with the projector 10 set in a reproducing mode, the image compression/expansion section 31 performs a process in which the image compression/expansion section 31 reads out the image data recorded in the memory card 32 and expands the individual image data that makes up a series of dynamic images frame by frame, outputting the image data to the display encoder 24 by way of the image transforming section 23, whereby dynamic images or the like can be displayed based on the image data stored in the memory card 32.

A keys/indicators section 37 is configured of main keys, indicators, and the like which are provided on a casing of the projector 10, and operation signals of the keys/indicators section 37 are sent out directly to the processor 38. Key operation signals from a remote controller are received by an IR reception section 35 and are then demodulated into a code signal in an Ir processing section 36 for output to the processor 38.

The processor 38 is connected with an audio processing section 47 byway of the system bus (SB). This audio processing section 47 includes a circuitry for a sound source such as a PCM sound source. With the projector 10 set in a projection mode and the reproducing mode, the audio processing section 47 converts audio data into analog signals and drives a speaker 48 to output loudly sound or voice based on the audio data.

The processor 38 controls a light source control circuit 41, which acts as a light source control unit. This light source control circuit 41 controls separately light emitting operations of a red light source device, a green light source device, and a blue light source device of the light source unit 60 in such a manner that lights in predetermined wavelength ranges required in generating an image are emitted from the light source unit 60.

Further, the processor 38 causes a cooling fan drive control circuit 43 to detect temperatures using multiple temperature sensors which are provided in the light source unit 60 and the like so as to control revolution speeds of cooling fans based on the results of the temperature detections. In addition, the processor 38 also causes the cooling fan drive control circuit 43 to keep the cooling fans revolving by use of a timer or the like even after a power supply to a main body of the projector 10 is switched off. Alternatively, the processor 38 causes the cooling fan drive control circuit 43 to switch off the power supply to the main body of the projector 10 depending upon the results of the temperature detections by the temperature sensors.

Figure 2:
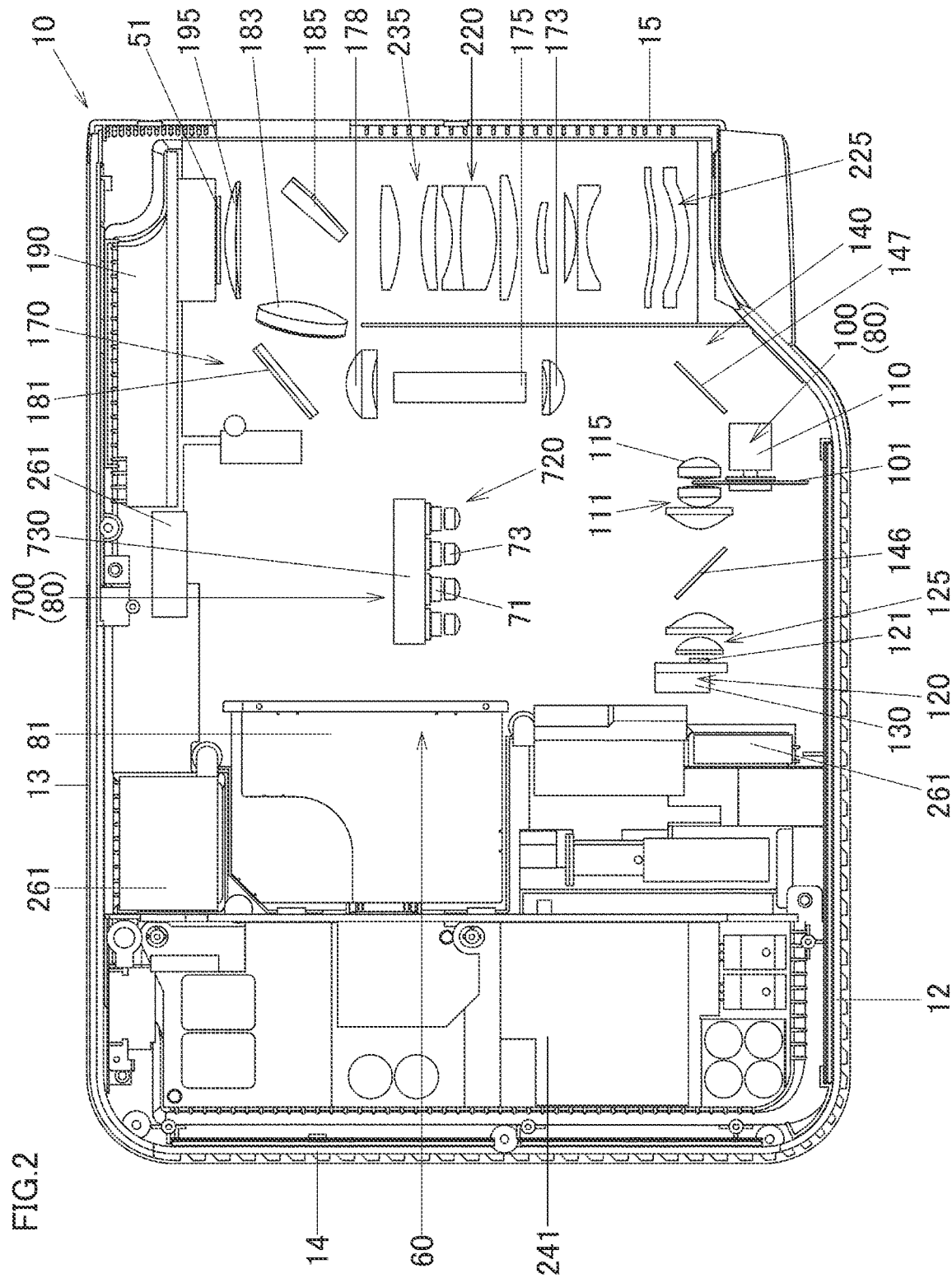
FIG. 2 is a schematic plan view showing an internal structure of the projector according to the first embodiment of the present invention.

Next, an internal structure of the projector 10 will be described. FIG. 2 is a schematic plan view showing the internal structure of the projector 10. Here, the casing of the projector 10 has a substantially box-like shape and includes an upper surface and a lower surface, a front panel 12, a back panel 13, a right panel 14, and a left panel 15. In the following description, when directions are referred to in relation to the projector 10, left and right refer, respectively, to left and right directions with respect to a projecting direction, and front and rear refer, respectively, to front and rear directions with respect to a direction of the projector 10 directed towards a screen and a traveling direction of a pencil of light.

The projector 10 includes a control circuit board 241 in the vicinity of the right panel 14. This control circuit board 241 includes a power supply circuitry block, a light source control block, and the like. In addition, the projector 10 includes the light source unit 60 provided at a side of the control circuit board 241, that is, at a substantially central portion of the casing of the projector 10. Further, the projector 10 includes a light source-side optical system 170 and a projection optical system 220, which are disposed between the light source unit 60 and the left panel 15.

The light source unit 60 includes an excitation light shining device 700, which constitutes not only a light source for light having a wavelength in the blue wavelength range or simply light in the blue wavelength range (light in a first wavelength range) but also an excitation light source, a red light source device 120, which constitutes a light source for light having a wavelength in the red wavelength range or simply light in the red wavelength range (light in a second wavelength range), and a green light source device 80, which constitutes a light source for light having a wavelength in the green wavelength range or simply light in the green wavelength range (light in a third wavelength range). The green light source device 80 is configured of the excitation light shining device 700 and a luminescent wheel device 100. In addition, in the light source unit 60, a light guiding optical system 140 is disposed which is configured to guide light in the blue wavelength range, light in the green wavelength range, and light in the red wavelength range. The light guiding optical system 140 includes a dichroic mirror 146 and a reflecting mirror 147 (a total reflecting mirror) and collects lights in the blue, green and red wavelength ranges which are emitted from the excitation light shining device 700, the green light source device 80, and the red light source device 120, respectively, to an incident port of a light tunnel 175.

The excitation light shining device 700, which constitutes a light source device, is disposed at a substantially central portion in the casing of the projector 10 in a left-right direction thereof. In the excitation light shining device 700, multiple blue diodes 71 (a first light source), which are a total of eight semiconductor light emitting elements arranged in a matrix configuration of two rows and four columns, are held in place on a holding member 730. Collimator lenses 73 are disposed individually on respective optical axes of the blue laser diodes 71 to convert lights emitted from the blue laser diodes 71 into parallel lights so as to enhance the directivity thereof. The excitation light shining device 700 is disposed in such a manner that light emitted therefrom travels in the direction of the front panel 12.

A heat sink 81 is provided for the excitation light shining device 700, and this heat sink 81 is thermally connected with the holding member 73 by way of a heat pipe, not shown, or the like. A cooling fan 261 is disposed between the heat sink 81 and the back panel 13, so that the blue laser diodes 71 are cooled by the cooling fan 261 and the heat sink 81. A cooling fan 261 is also disposed between the excitation light shining device 700 and the back panel 13.

The luminescent wheel device 100 of the green light source device 80 includes a luminescent wheel 101, a motor 110, a collective lens group 111, and a collective lens 115. The luminescent wheel 101 is disposed in such a manner as to be parallel to the right panel 14, that is, in such a manner as to intersect at right angles to an axis of light in the blue wavelength range which is reflected by the dichroic mirror 146 to act as excitation light. The collective lens group 111 collects excitation light so as to be shined onto the luminescent wheel 101, while the collective lens 115 collects a pencil of light which is emitted from the luminescent wheel 101 in the direction of the left panel 15.

Figure 3:
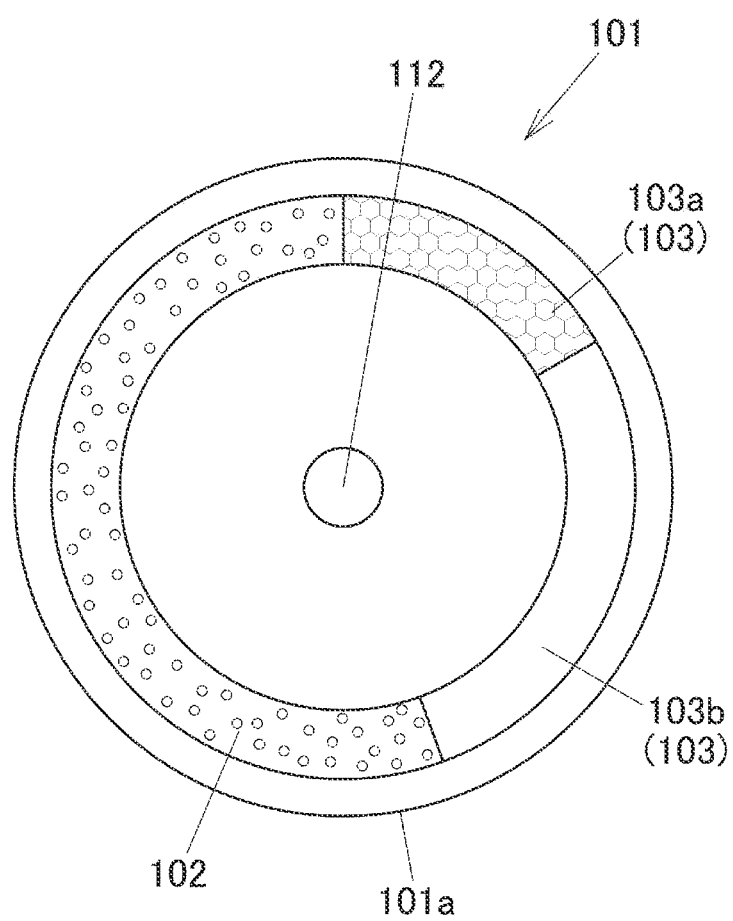
FIG. 3 is a front view of a luminescent wheel of the projector according to the first embodiment of the present invention.

As shown in FIG. 3, the luminescent wheel 101 is formed of a plate-like metallic base 101a having a circular disk shape. A motor shaft 112 of the motor 110 is connected to a center of the luminescent wheel 101, whereby the luminescent wheel 101 is rotationally driven by the motor 110. A luminescent light emitting area 102 (a wavelength transforming area), a diffuse transmitting area 103a, and a transmitting area 103b are provided end to end on the metallic base 101a of the luminescent wheel 101 (a wheel). The luminescent light emitting area 102 is formed over an angular range of about 200 degrees, the diffuse transmitting area 103a is formed over an angular range of about 60 degrees, and the transmitting area 103b is formed over an angular range of about 100 degrees. The luminescent light emitting area 102, the diffuse transmitting area 103a, and the transmitting area 101b are individually fitted in the metallic base 101a.

The luminescent light emitting area 102 is formed of a transmitting luminescent body of a circular arc-shaped plate. In this transmitting luminescent body, excitation light is incident thereon from one surface or a first surface side, and luminescent light excited by the excitation light is emitted from the other surface or a second surface side thereof. The transmitting luminescent body can be formed, for example, by dispersing a luminescent material in a binder of an organic family or a binder of an inorganic family such as a silicone resin, an epoxy resin, or the like for solidification or as a sintered body of a powder mixture of a glass powder and a luminescent material powder. Alternatively, the transmitting luminescent body can also be formed by laying a luminescent material on one surface or a first surface, or the other surface or a second surface of a light transmitting glass which is formed into an arc-shaped plate.

Luminescent light emitted from the luminescent material of the transmitting luminescent body is emitted in every direction. Consequently, a filter configured to transmit or reflect predetermined light is provided on a one surface or first surface side, or the other surface or a second surface side of the transmitting luminescent body. For example, in the case that the filter is provided on the first surface side (in this first embodiment, a front surface side of the luminescent wheel 101) on which excitation light is incident, the filter is configured to transmit excitation light (light in the blue wavelength range) and reflect luminescent light (ling in the green wavelength range). On the other hand, in the case that the filter is provided on the second surface side (in this first embodiment, a back surface side of the luminescent wheel 101) which is opposite to the side on which excitation light is incident, the filter is configured to reflect excitation light and transmit luminescent light.

The diffuse transmitting area 103a is formed as an area on which light in the blue wavelength range from the excitation light shining device 700, which is laser light, is incident and which is configured to transmit the laser light while diffusing it. For example, the diffuse transmitting area 103a is formed of a diffuse plate in the form of an arc-shaped plate. On the other hand, the transmitting area 103b is formed as an area which is configured to transmit light in the red wavelength range from the red light source device 120 without diffusing it. For example, the transmitting area 103b is formed of a glass plate in the form of an arc-shaped plate. Thus, the diffuse transmitting area 103a and the transmitting area 103b make up the transmitting area 103 which emits light which is incident thereon from one surface or a first surface side from the other surface or a second surface side thereof.

The red light source device 120 includes a red light source 121 disposed in such a manner as to emit light in the direction of the left panel 15 and a collective lens group 125 for collecting light emitted from the red light source 121. This red light source 121 is a red light emitting diode (a second light source) which is a semiconductor light emitting element for emitting light in the red wavelength range. The red light source device 120 includes a heat sink 130 which is disposed at a side of the red light source 121 which faces the right panel 14. A cooling fan 261 is disposed on a side of the heat sink 130 which faces the right panel 14 to cool the heat sink 130, which then cools the red light source 121.

The dichroic mirror 146 is disposed in a position where light emitted from the red light source device 120 and light emitted from the excitation light shining device 700 intersect. The dichroic mirror 146 transmits light in the red wavelength range and reflects light in the blue wavelength range. As a result, light in the red wavelength range emitted from the red light source device 120 passes through the dichroic mirror 146 and is then incident on the collective lens group 111. On the other hand, an axis of light in the blue wavelength range emitted from the excitation light shining device 700 is changed in direction through 90 degrees to be reflected towards the left panel 15 and is eventually incident on the collective lens group 111.

The reflecting mirror 147 is disposed on a side of the collective lens 115 which faces the left panel 15. The reflecting mirror 147 changes the direction of an axis of light emitted from the collective lens 115 through 90 degrees to reflect the light towards the back panel 13, causing the light to be incident on a collective lens 173 of the light source-side optical system 170. A configuration may be adopted in which light emitted from the collective lens 115 is caused to be incident directly on the collective lens 173 without providing the reflecting mirror 147.

The light source-side optical system 170 includes the collective lens 173, the light tunnel 175, a collective lens 178, a light axis changing mirror 181, a collective lens 183, a shining mirror 185, and a condenser lens 915. The condenser lens 195 emits image light emitted from the display device 51, which is disposed on a side of the condenser lens 195 which faces the back panel 13, towards the projection optical system 220, and therefore, the condenser lens 195 is included in the projection optical system 220 as a part thereof.

The collective lens 173 is disposed in the vicinity of the light tunnel 175 to collect light source light to the incident port of the light tunnel 175. As a result, light in the red wavelength range, light in the green wavelength range, and light in the blue wavelength range, which are reflected by the reflecting mirror 147, are collected by the collective lens 173 to be incident on the light tunnel 175. A pencil of light incident on the light tunnel 175 is transformed into a pencil of light whose intensity is distributed more uniformly by the light tunnel 175.

The light axis changing mirror 181 is disposed by way of the collective lens 178 on an optical axis of the light tunnel 175 at a side of the light tunnel 175 which faces the back panel 13. A pencil of light emerging from an emerging port of the light tunnel 175 is collected by the collective lens 178, whereafter an axis of the pencil of light so collected is then changed in direction towards the left side panel 15 by the light axis changing mirror 181.

The pencil of light reflected by the light axis changing mirror 181 is collected by the collective lens 183 and is then shined onto the display device 51 at a predetermined angle by way of the condenser lens 195 by the shining mirror 185. In the first embodiment, the display device 51 is the digital micromirror device or DMD, and a heat sink 190 is provided at a side of the display device 51 which faces the back panel 13, whereby the display device 51 is cooled by this heat sink 190.

The pencil of light, which is light source light, shined onto an image forming plane of the display device 51 by the light source-side optical system 170 is reflected by the image forming plane of the display device 51 and is then projected onto a screen by way of the projection optical system 220 as projected light. Here, the projection optical system 220 includes the condenser lens 195, the movable lens group 235 and a fixed lens group 225. The movable lens group 235 can be moved by a lens motor. The movable lens group 235 and the fixed lens group 225 are incorporated in a fixed lens barrel. As a result, the fixed lens barrel incorporating therein the movable lens group 235 is made into a variable-focus lens and is configured so as to enable zooming and focusing.

With the projector 10 configured as described heretofore, the excitation light shining device 700 and the red light source device 120 are selectively driven by the light source control circuit 41 in accordance with an image signal inputted by way of the input/output interface 22. As a result, lights are emitted at different timings from the excitation light shining device 700 and the red light source device 120. Then, lights in the red, green, and blue wavelength ranges which are emitted from the excitation light shining device 700, which constitutes the blue light source, the green light source device 80, and the red light source device 120, respectively, are sequentially incident on the collective lens 173 and the light tunnel 175 by way of the light guiding optical system 140 and are then incident on the display device 51 by way of the light source-side optical system 170, whereby DMD, which is the display device 51 of the projector 10, displays the blue, green and red lights in accordance with the data in a time dividing fashion, thereby making it possible for a color image to be projected onto the screen.

Second Embodiment

Next, a second embodiment of the present invention will be described based on FIG. 4. A projector 10A according to this second embodiment differs from the projector 10 according to the first embodiment in that the arrangement of the excitation light shining device 700 of the first embodiment is changed. In this second embodiment, an excitation light shining device 700 is disposed in such a manner that light emitted therefrom becomes parallel to light emitted from a red light source device 120. As a result, in relation to shining spots formed on a luminescent wheel 101, a shining spot is formed on which light in the blue wavelength range from the excitation light shining device 700 is shined, in addition to a shining spot on which light in the red wavelength range from the red light source device 120 is shined.

The two shining spots can be set in arbitrary circumferential positions of the luminescent wheel 101. In association with this, in addition to a collective lens group 111 configured to collect light in the red wavelength range from the red light source device 120 and a collective lens 115 configured to collect light in the red wavelength range which passes through a transmitting area 103b on the luminescent wheel 101, a collective lens group 111a configured to collect light in the blue wavelength range from the excitation light shining device 700 and a collective lens 115a configured to collect light in the green wavelength range are disposed on a luminescent wheel device 100, the light in the green wavelength range being luminescent light which is emitted from a back surface side of the luminescent wheel 101 as a result of a luminescent material being excited when light in the blue wavelength range from the excitation light shining device 700 is shined on a luminescent light emitting area 102 as excitation light.

A dichroic mirror 146A is disposed on a side of the collective lens 115a which faces a left panel 15. The dichroic mirror 146A reflects light in the blue wavelength range and light in the green wavelength range and transmits light in the red wavelength range.

Consequently, the dichroic mirror 146A reflects light in the blue wavelength range which passes through the diffuse transmitting area 103a of the luminescent wheel 101 while being diffused and which is then emitted from the collective lens 115a and light in the green wavelength range which is emitted from the collective lens 115a as a result of a luminescent material in the luminescent light emitting area 102 being excited towards the back panel 13, causing them to be incident on the collective lens 173. Then, light in the red wavelength range emitted from the collective lens 115 is reflected towards the back panel 13 by the reflecting mirror 147, passes through the dichroic mirror 146A and is eventually incident on the collective lens 173. In this way, the light in the red wavelength range, the light in the green wavelength range, and the light in the blue wavelength range are combined together on the same optical path at the collective lens 173.

Third Embodiment

Next, a third embodiment of the present invention will be described based on FIG. 5. A projector 10B according to this third embodiment differs from the projector 10A according to the second embodiment in that the arrangement of the red light source device 120 shown in FIG. 4 is changed. That is, a red right source device 120 according to this third embodiment is disposed in such a manner that light emitted therefrom does not pass through a luminescent wheel 101 and becomes substantially at right angles to light emitted from an excitation light shining device 700.

As a result, the configuration of a luminescent wheel device 100 becomes the same as the configuration of the luminescent wheel device 100 according to the first embodiment shown in FIG. 2. That is, the luminescent wheel device 100 does not need the collective lens group 111 for collecting light in the red wavelength range from the red light source device 120 and the collective lens 115 for collecting light in the red wavelength range that passes through the transmitting area 103b of the luminescent wheel 101 as shown in FIG. 4.

Figure 4:
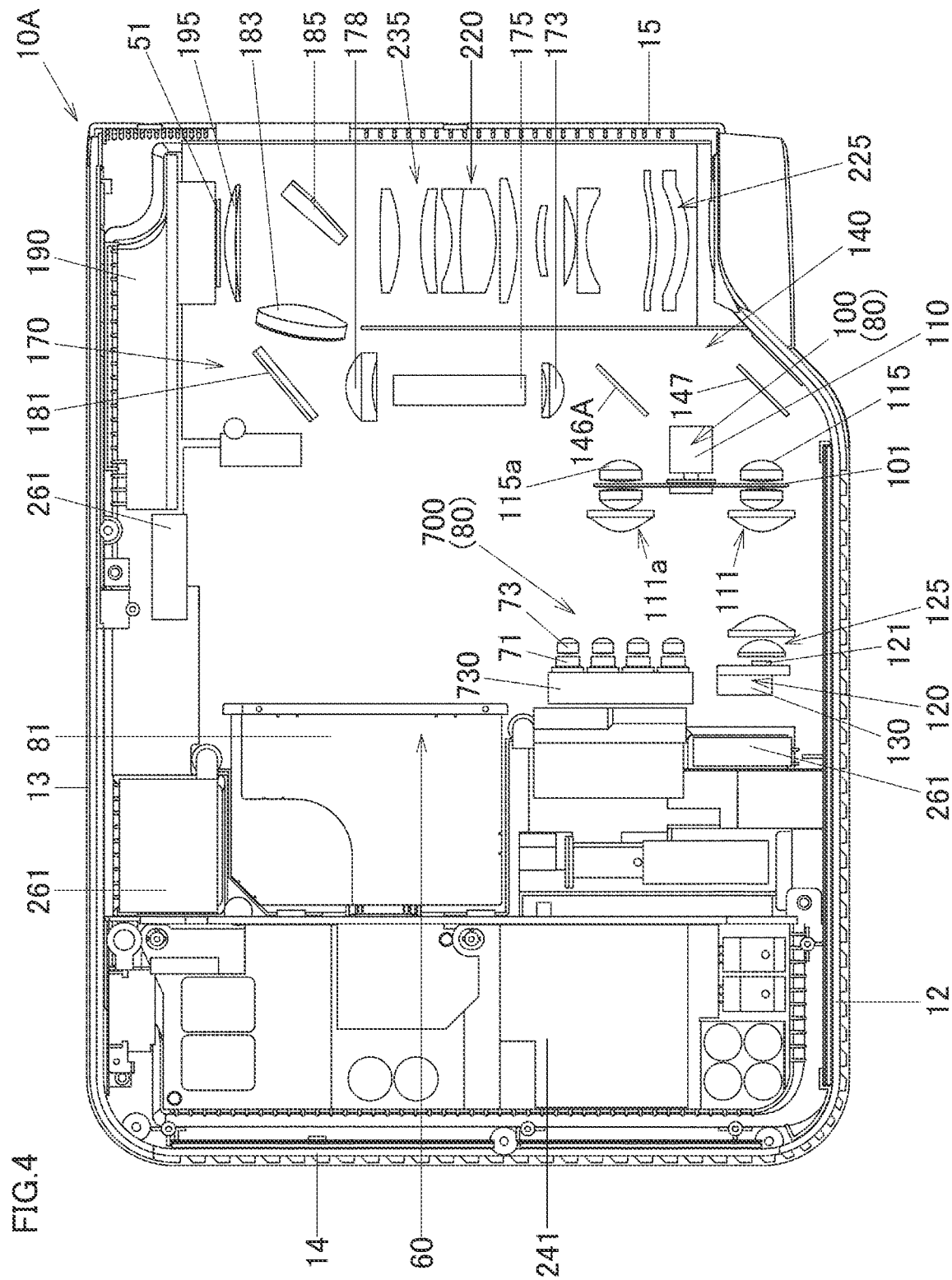
FIG. 4 is a schematic plan view showing an internal structure of a projector according to a second embodiment of the present invention.
Figure 5:
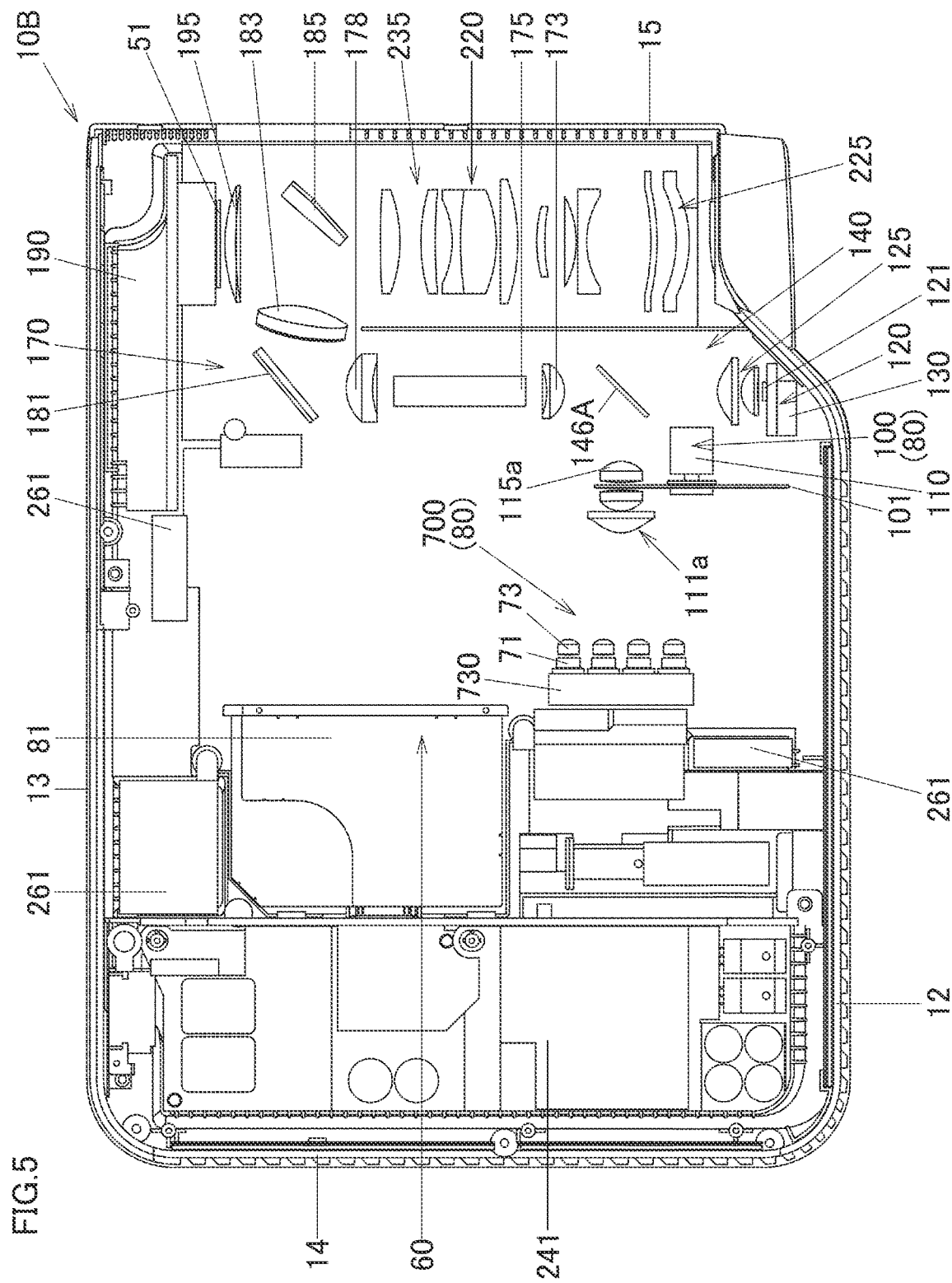
FIG. 5 is a schematic plan view showing an internal structure of a projector according to a third embodiment of the present invention.

However, a collective lens group 111a for collecting light in the blue wavelength range from an excitation light shining device 700 and a collecting lens 115a for collecting light in the blue wavelength range and light in the green wavelength range which is luminescent light emitted from a back surface side of the luminescent wheel 101 as a result of a luminescent material in a luminescent light emitting area 102 being excited by the light in the blue wavelength range are arranged similarly to the arrangement in the second embodiment shown in FIG. 4.

Further, a dichroic mirror 146A, which is configured to reflect light in the blue wavelength range and light in the green wavelength range and transmit light in the red wavelength range, is arranged similarly to the arrangement in the second embodiment shown in FIG. 4, that is, on a side of the collective lens 115a which faces a left panel 115.

As a result of the configuration described above, when compared with the second embodiment shown in FIG. 4, the collective lens group 111 and the collective lens 115 become unnecessary. In addition, a reflecting mirror 147 for reflecting light in the red wavelength range like the reflecting mirror 147 provided in the first embodiment shown in FIG. 2 and the second embodiment shown in FIG. 4 also becomes unnecessary. As a result, the number of component parts can be reduced, whereby the projector can be made smaller in size.

While the embodiments of the present invention have been described heretofore, the present invention is not limited in any way by the embodiments, and hence, various modifications can be made thereto. For example, in the embodiments described heretofore, the red light emitting diode is used as the red light source 121 of the red light source device 120; however, a red laser diode may be used. In this case, the transmitting area 103 of the luminescent wheel 101 can be formed of a diffuse plate (in other words, the transmitting area 103 can be formed only of the diffuse transmitting area 103a). Then, since a laser beam can be shined on the transmitting area 103 which moves in the circumferential direction by rotationally driving the luminescent wheel 101 for a period of time during which light emitted from the red laser diode and light emitted from the blue laser diodes 71 are shined on the transmitting area 103, speckle noise can be reduced. In addition, since both light in the red wavelength range and light in the blue wavelength range pass through the transmitting area 103 of the luminescent wheel 101, the bright laser light sources can be made use of without disposing any exclusive diffuse plate for the excitation light shining device 700 or the red light source device 120.

The luminescent light emitting area 102 of the luminescent wheel 101 may be a luminescent light emitting area 102 formed of a luminescent material configured to be excited by excitation light to thereby emit light in the red wavelength range. In this case, a green light source device including a green laser diode or a green light emitting diode can replace the red light source device 120.

Thus, according to the embodiments of the present invention that have been described heretofore, the luminescent wheel 101 (a wheel) includes the luminescent light emitting area 102 (a wavelength transforming area) configured to receive light in the blue wavelength range which is emitted from the excitation light shining device 700 and is incident thereon from the front surface side, which is the first surface side, as excitation light, transform the light in the blue wavelength range so received into luminescent light and emit the luminescent light so transformed from the back surface side, which is the second surface side, and the transmitting area 103 configured to emit the light in the blue wavelength range which is incident thereon from the front surface side or light in the red wavelength range from the red light source device 120 from the back surface side, the luminescent light emitting area 102 and the transmitting area 103 being provided end to end in the circumferential direction. Then, the dichroic mirrors 146, 146A transmit one of light in the blue wavelength range and light in the red wavelength range and reflect the other.

As a result, since light can be configured so as to enter from the front surface side to be emitted towards the back surface side, compared with the configuration in which luminescent light is emitted to the front surface side and light source light, which also acts as excitation light, is emitted to the back surface side, the number of component parts of the optical element can be reduced, whereby the miniaturization of the light source unit 60 can be realized.

The transmitting area 103 includes the transmitting area 103b configured to transmit light without diffusing it and the diffuse transmitting area 103a configured to emit light while diffusing it, which are provided end to end in the circumferential direction. As a result, a configuration can be adopted in which one light source (for example, the red light source device 120) is configured of a red light emitting diode so that light in the red wavelength range emitted therefrom passes through the transmitting area 103b, and the other light source (for example, the excitation light shining device 700) is configured of blue laser diodes 71 so that light in the blue wavelength range emitted therefrom passes through the diffuse transmitting area 103a while being diffused.

The transmitting area 103 may be made up of a diffuse transmitting area configured to transmit light while diffusing it. As a result, even in the case that a red laser diode for emitting laser light is also used for the red light source device 120, a diffuse plate does not have to be prepared for each light source of laser light.

The dichroic mirror 146 is disposed on the front surface side, which is the first surface side, of the luminescent wheel 101 which faces the reflecting mirror 147. As a result, providing a configuration will be sufficient in which the dichroic mirror 146 is disposed in the position where lights emitted from the excitation light shining device 700 and the red light source device 120 intersect each other and one set of optical elements such as a collective lens group 111 configured to shine light on the luminescent wheel 101, a collective lens 115 configured to collect light emitted from the back surface side of the luminescent wheel 101, and the like is prepared.

The dichroic mirror 146A is disposed on the second surface side of the luminescent wheel 101. As a result, the excitation light shining device 700 and the red light source device 120 can be disposed in such a manner that lights emitted from both the devices become parallel to each other.

The dichroic mirrors 146, 146A are configured to reflect light in the blue wavelength range and transmit light in the red wavelength range. As a result, the degree of freedom in laying out the excitation light shining device 70 for emitting light in the blue wavelength range and the red light source deice 120 for emitting light in the red wavelength range can be enhanced.

The reflecting mirror 147 (the total reflecting mirror) can be disposed on the second surface side of the luminescent wheel. As a result, the direction of the axis of light emitted from the luminescent wheel 101 can be changed.

The luminescent wheel 101 includes the luminescent light emitting area 102 configured to emit luminescent light. As a result, bright luminescent light can be made use of as a light source.

The filter, which is configured to transmit light in the blue wavelength range and reflect luminescent light, is provided on the first surface side of the luminescent light emitting area 102. As a result, the efficiency of excitation of luminescent light by excitation light can be enhanced.

The projectors 10, 10A include the light source unit 60, the display device 51, the projection optical system 220, and the projector control unit. As a result, it is possible to provide the projectors 10, 10A which are made small in size.

In the embodiments that have been described heretofore, the luminescent light emitting area employing the luminescent material is described as constituting the wavelength transforming area; however, the present invention is not limited to this configuration. A configuration may be adopted in which a wavelength transforming material, a wavelength transforming film, or the like is used in place of the luminescent material.

While the embodiments of the present invention have been described heretofore, the embodiments are presented as examples, and hence, there is no intention to limit the scope of the present invention by the embodiments. The novel embodiments can be carried out in other various forms, and various omissions, replacements and modifications can be made thereto without departing from the spirit and scope of the present invention. Those resulting embodiments and their modifications are included in the scope and gist of the present invention and are also included in the scope of inventions claimed for patent under claims below and their equivalents.

What is claimed is:

1. A light source unit comprising:
   a first light source for emitting light in a first wavelength range;
   a second light source for emitting light in a second wavelength range which differs in wavelength range from the light in the first wavelength range;
   a wheel comprising a wavelength transforming area configured to receive the light in the first wavelength range that is incident thereon from a first surface side to thereby transform the light in the first wavelength range into light in a third wavelength range which differs in wavelength range from the light in the first wavelength range and the light in the second wavelength range and emit the light in the third wavelength range from a second surface side and a transmitting area for emitting the light in the first wavelength range that is incident thereon from the first surface side from the second surface side, the wavelength transforming area and the transmitting area being provided end to end in a circumferential direction; and
   a dichroic mirror configured to transmit one of the light in the first wavelength range and the light in the second wavelength range and reflect a remaining light,
   wherein the transmitting area comprises a transmitting area configured to transmit light without diffusing it and a diffuse transmitting area configured to transmit light while diffusing it, the transmitting area and the diffuse transmitting area being provided end to end in the circumferential direction.

2. The light source unit according to claim 1, wherein the light in the second wavelength range is incident on the transmitting area of the wheel from the first surface side and emerges from the second surface side.

3. The light source unit according to claim 2, wherein the transmitting area comprises a diffuse transmitting area configured to transmit light while diffusing it.

4. The light source unit according to claim 2, wherein a total reflecting mirror is disposed on the second surface side of the wheel.

5. The light source unit according to claim 1, wherein the transmitting area comprises a diffuse transmitting area configured to transmit light while diffusing it.

6. The light source unit according to claim 1, wherein the dichroic mirror is disposed on a first surface side of the wheel.

7. The light source unit according to claim 6, wherein the dichroic mirror reflects the light in the first wavelength range and transmits the light in the second wavelength range.

8. The light source unit according to claim 1, wherein the dichroic mirror is disposed on a second surface side of the wheel.

9. The light source unit according to claim 8, wherein the dichroic mirror reflects the light in the first wavelength range and transmits the light in the second wavelength range.

10. The light source unit according to claim 1, wherein a total reflecting mirror is disposed on the second surface side of the wheel.

11. The light source unit according to claim 1, wherein the first light source is a blue laser diode, wherein the second light source is a red light emitting diode, and wherein the wheel comprising the wavelength transforming area configured to emit the light in the third wavelength range is a luminescent wheel comprising a luminescent light emitting area configured to emit luminescent light.

12. The light source unit according to claim 1, wherein a first collective lens and a second collective lens are disposed on the first surface side of the wheel, wherein the light in the first wavelength range is collected by the first collective lens and is then incident on the wheel, and wherein the light in the second wavelength range is collected by the second collective lens and is then incident on the wheel.

13. The light source unit according to claim 1, wherein a motor configured to rotate the wheel is disposed on the second surface side of the wheel.

14. A projector comprising:
    the light source unit according to claim 1;
    a display device on which light source light emitted from the light source unit is shined to thereby form image light,
    a projection optical system for projecting the image light emitted from the display device onto a projection target member; and
    a control unit for controlling the display device and the light source unit.

15. A light source unit comprising:
- a first light source for emitting light in a first wavelength range;
- a second light source for emitting light in a second wavelength range which differs in wavelength range from the light in the first wavelength range;
- a wheel comprising a wavelength transforming area configured to receive the light in the first wavelength range that is incident thereon from a first surface side to thereby transform the light in the first wavelength range into light in a third wavelength range which differs in wavelength range from the light in the first wavelength range and the light in the second wavelength range and emit the light in the third wavelength range from a second surface side and a transmitting area for emitting the light in the first wavelength range that is incident thereon from the first surface side from the second surface side, the wavelength transforming area and the transmitting area being provided end to end in a circumferential direction; and
- a dichroic mirror configured to transmit one of the light in the first wavelength range and the light in the second wavelength range and reflect a remaining light,
- wherein the dichroic mirror reflects the light in the first wavelength range and the light in the third wavelength range which are emitted from the second surface side of the wheel.

* * * * *